United States Patent
Chou et al.

(10) Patent No.: US 9,687,961 B2
(45) Date of Patent: Jun. 27, 2017

(54) GRINDING TOOL AND METHOD OF MANUFACTURING THE SAME

(71) Applicant: KINIK COMPANY, Taipei (TW)

(72) Inventors: Jui-Lin Chou, New Taipei (TW);
I-Tsao Liao, New Taipei (TW);
Chia-Feng Chiu, New Taipei (TW);
Jen Feng Chen, New Taipei (TW);
Sheng Kai Hong, New Taipei (TW)

(73) Assignee: KINIK COMPANY, Taiwan (CN)

( * ) Notice: Subject to any disclaimer, the term of this patent is extended or adjusted under 35 U.S.C. 154(b) by 9 days.

(21) Appl. No.: 14/962,992

(22) Filed: Dec. 8, 2015

(65) Prior Publication Data

US 2016/0176017 A1     Jun. 23, 2016

(30) Foreign Application Priority Data

Dec. 17, 2014   (TW) .............................. 103144159 A (51) Int. Cl.
| | | |
|---|---|---|
| *A61F 13/15* | (2006.01) | |
| *B27N 3/00* | (2006.01) | |
| *B32B 17/00* | (2006.01) | |
| *B29C 65/00* | (2006.01) | |
| *B32B 37/00* | (2006.01) | |

(Continued)

(52) U.S. Cl.
CPC ........ *B24B 53/017* (2013.01); *B24D 18/0009* (2013.01); *B24D 18/0018* (2013.01); *B24D 18/0072* (2013.01); *B29C 65/4835* (2013.01); *B29C 66/028* (2013.01);
(Continued)

(58) Field of Classification Search
CPC ....... B24B 53/017; B24B 53/12; B24D 18/00; B24D 18/0072; B29C 65/00; B29C 65/48; B29C 65/4835; B29C 66/00; B29C 66/02241; B29C 66/0242; B29C 66/028;
(Continued)

(56) References Cited

U.S. PATENT DOCUMENTS

| | | | | |
|---|---|---|---|---|
| 4,629,373 A | * | 12/1986 | Hall ..................... | B23B 27/146 175/434 |
| 2006/0068691 A1 | * | 3/2006 | Sung ................... | B24D 99/005 451/540 |

FOREIGN PATENT DOCUMENTS

| | | |
|---|---|---|
| JP | 2000218512 | 8/2000 |
| JP | 2007044824 A | 2/2007 |

(Continued)

OTHER PUBLICATIONS

Office Action dated Sep. 2, 2016 in corresponding Taiwan Patent Application No. 103144159.

(Continued)

*Primary Examiner* — Philip Tucker
*Assistant Examiner* — Brian R Slawski
(74) *Attorney, Agent, or Firm* — Baker & McKenzie LLP; David I. Roche (57) ABSTRACT

A grinding tool includes a substrate having a surface provided with a plurality of openings, and a plurality of grinding studs. Each of the grinding studs includes a stud portion and an abrasive particle attached to each other, the stud portions being respectively attached into the openings, and the abrasive particles protruding outward from the surface, each of the abrasive particles having a pattern cut across a tip thereof to define multiple apexes adjacent to one another. In some embodiments, methods of fabricating a grinding tool are also described.

7 Claims, 11 Drawing Sheets

(51) Int. Cl.
- B32B 38/04 (2006.01)
- B29C 65/48 (2006.01)
- B24D 11/00 (2006.01)
- B24D 3/02 (2006.01)
- C09C 1/68 (2006.01)
- C09K 3/14 (2006.01)
- B24B 1/00 (2006.01)
- B24C 1/00 (2006.01)
- B23F 21/03 (2006.01)
- B23F 21/23 (2006.01)
- B24B 5/00 (2006.01)
- B24B 7/00 (2006.01)
- B24B 7/16 (2006.01)
- B24B 33/00 (2006.01)
- B24B 53/017 (2012.01)
- B24D 18/00 (2006.01)

(52) U.S. Cl.
CPC ....... *B29C 66/0242* (2013.01); *B29C 66/1122* (2013.01); *B29C 66/30325* (2013.01); *B29C 66/474* (2013.01)

(58) Field of Classification Search
CPC ........... B29C 66/1122; B29C 66/30325; B29C 66/474; B29C 66/5221; B29C 66/5241

USPC .......... 156/60, 62.2, 75, 153, 154, 155, 250, 156/256, 257, 263, 272.2, 272.8, 273.3, 156/293, 295, 297, 298, 303.1; 51/293, 51/297, 298, 299, 307, 309; 451/36, 37, 451/56, 66, 259, 540, 548

See application file for complete search history.

(56) References Cited

FOREIGN PATENT DOCUMENTS

| | | |
|---|---|---|
| JP | 481093 U | 7/2014 |
| JP | 2014176909 A | 9/2014 |
| TW | 184845 A4 | 12/1980 |
| TW | 103202785 | 2/2003 |
| TW | 562719 | 11/2003 |
| TW | 361125 I | 3/2010 |
| TW | 201036762 A1 | 10/2010 |
| TW | 201532734 | 9/2015 |

OTHER PUBLICATIONS

Office Action dated Jun. 6, 2016 in corresponding Taiwan Patent Application No. 103144159.

* cited by examiner

GRINDING TOOL AND METHOD OF MANUFACTURING THE SAME

CROSS-REFERENCE TO RELATED APPLICATION(S)

This application claims priority to Taiwan Patent Application No. 103144159 filed on Dec. 17, 2014, and which is incorporated herein by reference.

BACKGROUND

1. Field of the Invention

The present invention relates to grinding tools, and more particularly grinding tools that can be used in chemical mechanical polishing techniques.

2. Description of the Related Art

Grinding and/or polishing techniques are generally applied to create a desirable surface roughness or planarity on a rigid part, such as metal, ceramic or glass parts, or semiconductor wafers. To this purpose, the grinding and/or polishing techniques use tools having abrasive elements that can wear the rigid surface.

A well known polishing technique is the chemical mechanical polishing (CMP) technique employed in semiconductor fabrication processes. CMP uses corrosive chemical slurry in conjunction with a polishing pad to remove undesired residues and planarize a wafer surface, which can be made of ceramic, silicon, glass, sapphire or metal. CMP can be typically conducted multiple times to planarize wafers. For example, the fabrication process of semiconductor wafers having 28 nm-wide features may require up to 30 CMP steps. After the polishing pad is used over a period of time, the grinding action of the polishing pad may diminish. Accordingly, an additional grinding tool (also called "conditioner") may be typically used to coarsen the surface of the polishing pad for maintaining an optimal grinding efficiency of the polishing pad.

Conventionally, a cutting rate of the grinding tool may be improved by increasing a distribution density of the abrasive elements provided thereon. This requires increasing the quantity of abrasive elements on the grinding tool, which makes the grinding tool more expensive to manufacture.

Therefore, there is a need for a grinding tool that can have an improved cutting rate, and can be fabricated in a cost-effective manner.

SUMMARY

The present application describes a grinding tool and methods of fabricating the grinding tool that can address at least the aforementioned problems. In one embodiment, the grinding tool includes a substrate having a surface provided with a plurality of openings, and a plurality of grinding studs. Each of the grinding studs includes a stud portion and an abrasive particle attached to each other, the stud portions being respectively attached into the openings, and the abrasive particles protruding outward from the surface, each of the abrasive particles having a pattern cut across a tip thereof to define multiple apexes adjacent to one another.

The present application further describes a method of fabricating a grinding tool. The method includes providing a plurality of grinding studs, each of the grinding studs including a stud portion and an abrasive particle bonded to each other, cutting a pattern across a tip of each of the abrasive particles to define multiple apexes adjacent to one another, providing a substrate having a plurality of openings, and attaching the grinding studs respectively in the openings, the abrasive particles of the grinding studs protruding from a surface of the substrate.

DETAILED DESCRIPTION OF THE EMBODIMENTS

Figure 1:
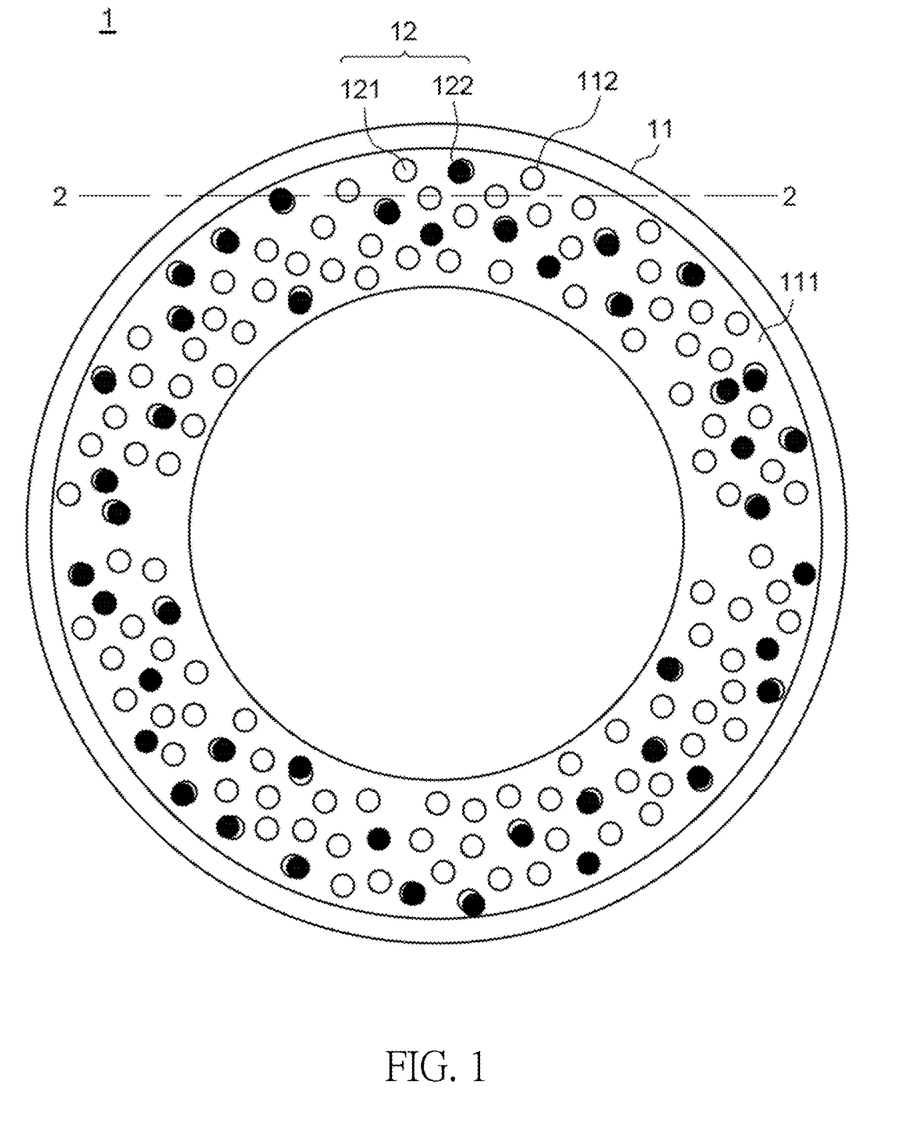
FIG. 1 is a schematic top view illustrating an embodiment of a grinding tool.
Figure 2:
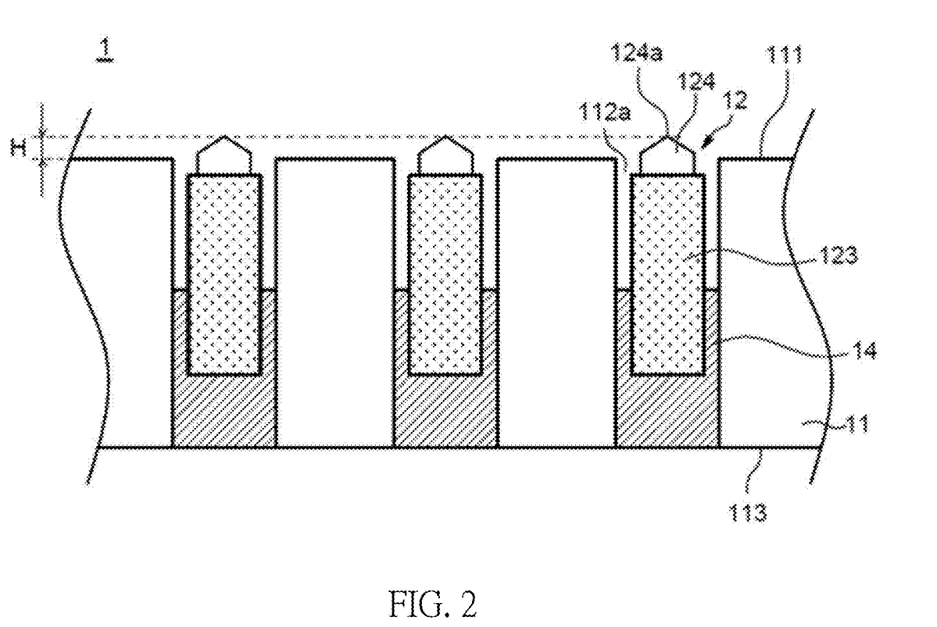
FIG. 2 is a cross-sectional view taken along section 2 shown in FIG. 1 illustrating a plurality of grinding studs attached in openings of the grinding tool.

FIG. 1 is a schematic top view illustrating an embodiment of a grinding tool 1, and FIG. 2 is a cross-sectional view taken along section 2 shown in FIG. 1 illustrating grinding studs 12 affixed in holes 112*a* of the grinding tool 1. Referring to FIGS. 1 and 2, the grinding tool 1 can include a substrate 11 and a plurality of grinding studs 12. The substrate 11 can have two surfaces 111 and 113 at two opposite sides, and a plurality of openings 112. The openings 112 can exemplary be holes 112*a* that are formed through the thickness of the substrate 11 and are respectively opened on the two opposite surfaces 111 and 113 of the substrate 11. Each grinding stud 12 can include a stud portion 123, and an abrasive particle 124 bonded to a top of the stud portion 123. In one embodiment, the stud portions 123 can be exemplary made of a metallic material, and the substrate 11 can be made of stainless steel.

Each of the stud portions 123 can be attached in one hole 112*a* via an adhesive layer 14, which can be exposed on the surface 113 of the substrate 11. The abrasive particles 124 of the grinding studs 12 can protrude outward from the surface 111 at a substantially similar height H (e.g., 100 μm) for applying substantially uniform grinding action on a part to be ground (e.g., a polishing pad used in a chemical mechanical polishing process). More specifically, each abrasive particle 124 can have a tip 124*a* that protrudes outward from the surface 111 of the substrate 11 by a vertical distance designated as a height H. In some embodiments, some of the abrasive particles 124 can protrude outward from the surface 111 by the height H, and others of the abrasive particles 124 can protrude from the surface 111 by a height smaller or greater than the height H (e.g., 150 μm).

In some embodiments, the abrasive particles 124 can be bonded to the stud portions 123 by brazing, sintering, electroplating and the like. The stud portions 123 can have any adequate shapes, e.g., cylindrical shapes, or prismatic shapes.

The abrasive particles 124 can be made of suitable materials having sufficiently high hardness, which can include, without limitation, diamond, cubic boron nitride, aluminum oxide, and silicon carbide. The particle size of the abrasive particles 124 can be exemplary between 20 and 30 US meshes, i.e., a screen used for filtering the abrasive particles 124 has 20 to 30 apertures per square inch.

Figure 3:
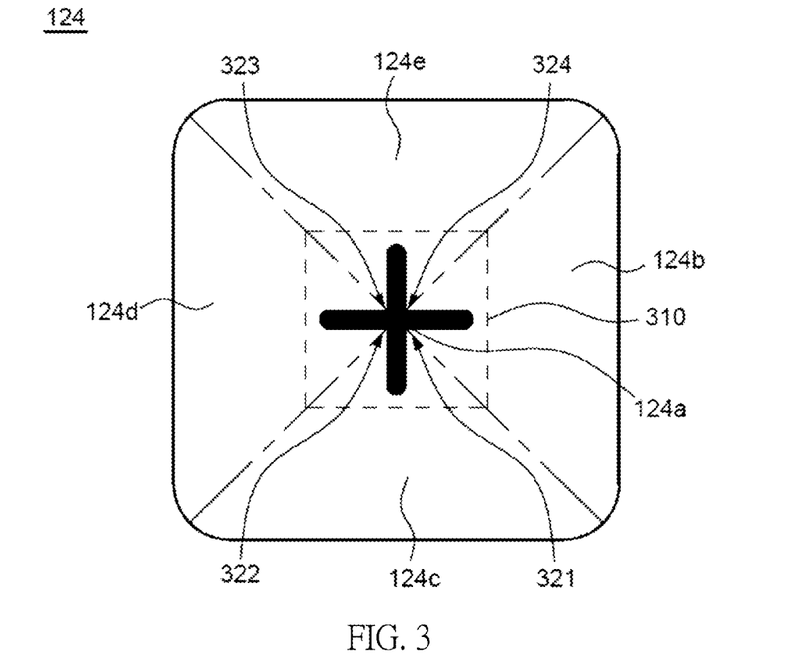
FIG. 3 is a top view illustrating the abrasive particles.

FIG. 3 is a top view illustrating the abrasive particles 124. Referring to FIGS. 2 and 3, according to one embodiment, each abrasive particle 124 can have a plurality of side surfaces 124b, 124c, 124d and 124e adjacent to a tip 124a of the abrasive particle 124, and a pattern 310 cut across the tip 124a. The pattern 310 can define a groove that extends onto each of the side surfaces 124b, 124c, 124d and 124e adjacent to the tip 124a. According to one embodiment, the pattern 310 can be cut by laser across the tip 124a of the abrasive particle 124. For example, a cold gas fiber laser having power of 20 watts can be applied at a rate of 75 hits per second to cut the pattern 310 on the tip 124a of the abrasive particle 124.

In one embodiment, the pattern 310 can have a cross shape that respectively cuts onto all of the side surfaces 124b, 124c, 124d and 124e adjacent to the tip 124a of the abrasive particle 124. As a result, the tip 124a of the abrasive particle 124 can locally have four distinct pointed ends or apexes 321, 322, 323 and 324 adjacent to one another that project at a substantially same height and are separated by the groove of the pattern 310. The multiple pointed ends or apexes 321, 322, 323 and 324 can increase the cutting rate of the abrasive particle 124. In some variant embodiments, the pattern 310 can have other shapes, e.g., asterisk-like symbols, concentric circles, chessboard pattern-like shapes, and any other shapes that can increase the number of local tips on the abrasive particle 124.

Referring to FIG. 1, according to one embodiment, the grinding studs 12 on the grinding tool 1 can include a plurality of first grinding studs 121 having no pattern cut on the tips of the abrasive particles 124, and a plurality of second grinding studs 122 having the pattern 310 cut on the tips of the abrasive particles 124. The first grinding studs 121 are represented with hollow circles, and the second grinding studs 122 are represented with black solid circles in FIG. 1. The first grinding studs 121 and the second grinding studs 122 may be distributed in an alternated way on the grinding tool 1, e.g., each second grinding stud 122 may have at least one neighboring first grinding stud 121. Moreover, the second grinding studs 122 may be distributed on the surface 111 of the grinding tool 1 in a generally uniform manner.

Figure 4:
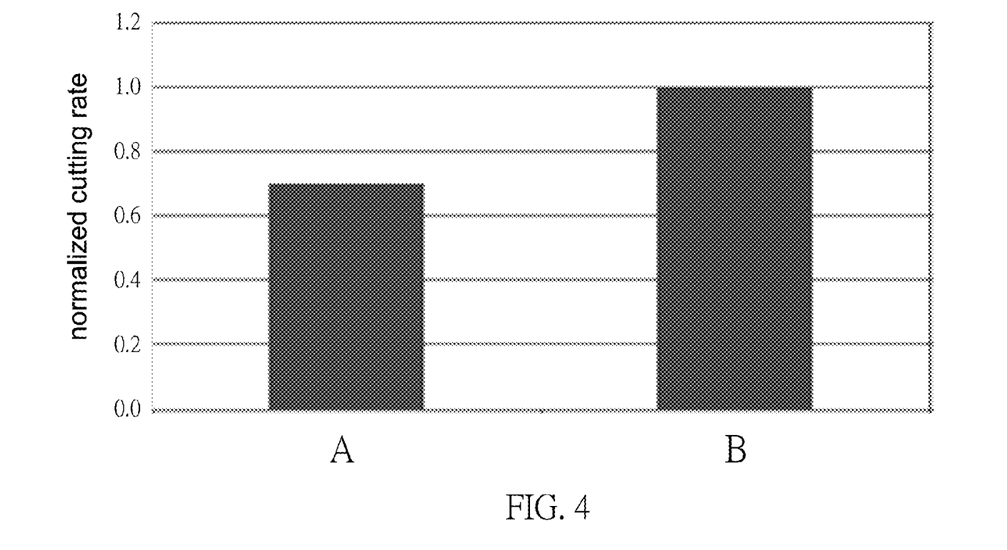
FIG. 4 is a schematic diagram comparing the cutting rate of a grinding tool described herein against the cutting rate of a conventional grinding tool.

Most conventional grinding tools have only abrasive particles with no patterns thereon (e.g., such as the abrasive particles 124 on the grinding studs 121). In contrast, the grinding tool 1 described herein can have grinding studs 122 having the pattern 310 cut on the tips 124a of the abrasive particles 124, which can substantially increase the cutting rate of the grinding tool 1. FIG. 4 is a schematic diagram comparing the cutting rate of the grinding tool 1 against the cutting rate of a conventional grinding tool. In FIG. 4, symbol A indicates a cutting rate of a conventional grinding tool, and symbol B indicates an exemplary cutting rate obtained with the grinding tool 1 having multiple apexes at the tip of abrasive particles 124, the cutting rates being normalized cutting rates. The cutting rate A of the conventional grinding tool is about 0.7, and the cutting rate B of the grinding tool 1 is about 1, which shows a clear improvement obtained with the grinding tool 1.

Figure 5:
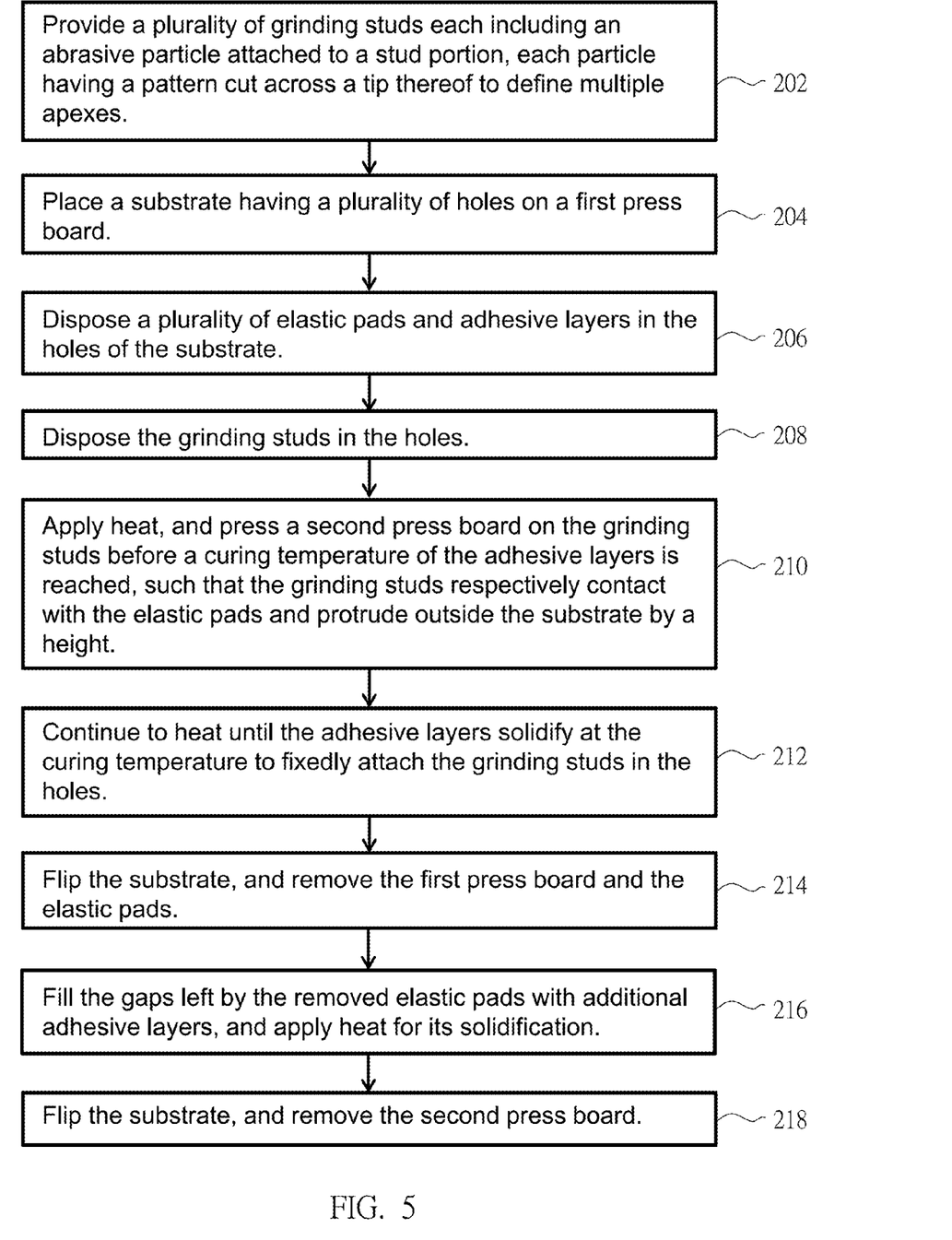
FIG. 5 is a flowchart illustrating exemplary method steps for fabricating a grinding tool.

In conjunction with FIGS. 1-3, FIG. 5 is a flowchart illustrating an embodiment of exemplary method steps for fabricating the grinding tool 1, and FIGS. 6A through 6F are cross-sectional views illustrating intermediate stages in the fabrication of the grinding tool 1 according to the flowchart of FIG. 5. Referring to FIGS. 2, 3 and 5, in initial step 202, a plurality of grinding studs 12 are provided, each including a stud portion 123 and an abrasive particle 124 bonded to each other. Moreover, each abrasive particle 124 can have the pattern 310 cut across a tip thereof so as to define multiple adjacent apexes.

Figure 6A:
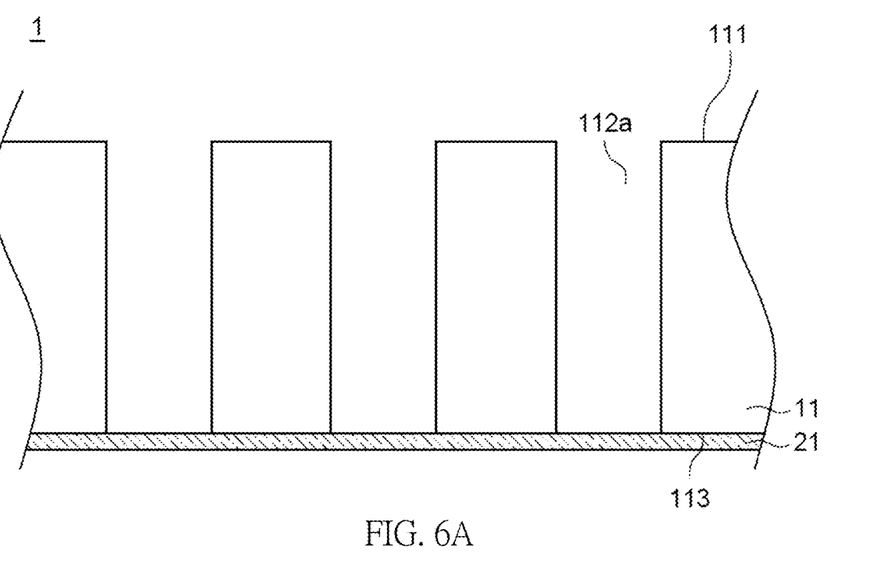
FIGS. 6A through 6F are cross-sectional views illustrating intermediate stages in the fabrication of a grinding tool according to the flowchart shown in FIG. 5.

Referring to FIGS. 5 and 6A, in step 204, a substrate 11 having a plurality of openings is provided. The openings can be holes 112a that are opened on the two opposite surfaces 111 and 113 of the substrate 11. The substrate 11 can be placed such that the surface 113 is in contact with a first press board 21 at an underside thereof, the first press board 21 closing the holes 112a on the side of the surface 113.

Figure 6B:
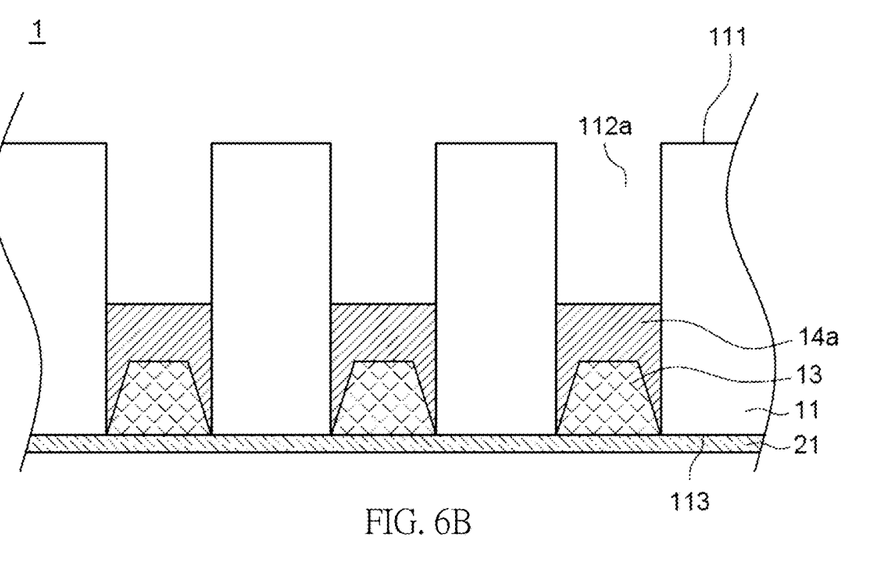

Referring to FIGS. 5 and 6B, in step 206, a plurality of elastic pads 13 (e.g., made of silicone) can be respectively disposed in the holes 112a so as to rest on the first press board 21, and adhesive layers 14a (e.g., made of epoxy resin) can be respectively applied in the holes 112a so as to cover the upper side of the elastic pads 13.

Figure 6C:
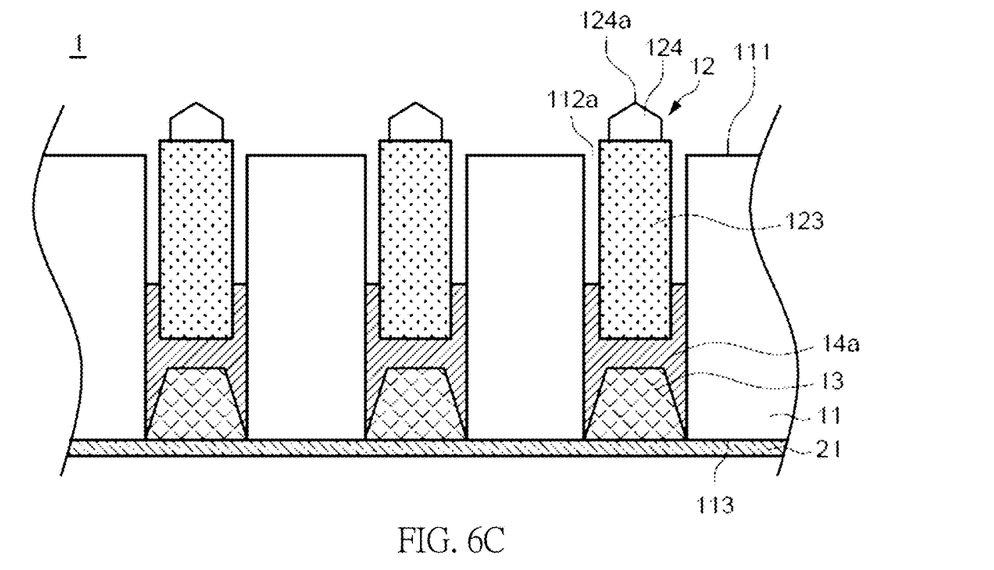

Referring to FIGS. 5 and 6C, the grinding studs 12 in step 208 then can be respectively disposed through the surface 111 of the substrate 11 into the holes 112a. In each hole 112a, the stud portion 123 is at least partially dipped in the adhesive layer 14a, and the elastic pad 13 and a portion of the adhesive layer 14a are sandwiched between the stud portion 123 and the press board 21.

Figure 6D:
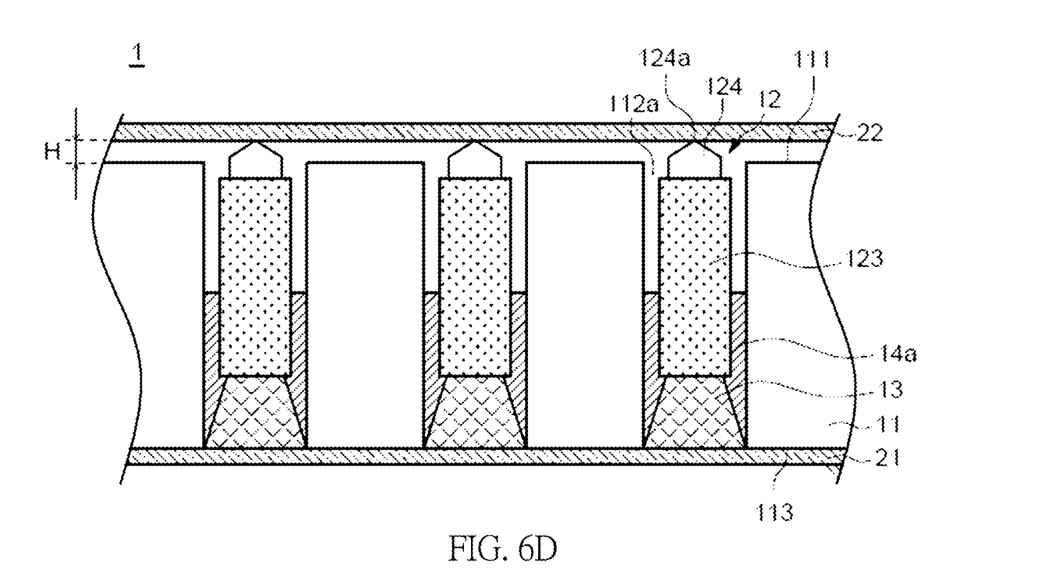

The adhesive layers 14a applied in the holes 112a of the substrate 11 can have a soft state at an ambient temperature, and can solidify after they are heated to a curing temperature. Referring to FIGS. 5 and 6D, in step 210, the elastic pads 13 and the adhesive layers 14a can be subject to a heating process, e.g., by heating the substrate 11 in an oven.

Before the curing temperature is reached, a second press board 22 is pressed generally parallel toward the surface 111 of the substrate 11 so as to apply substantially uniform pressure on the grinding studs 12, more specifically on the abrasive particles 124 thereof. As a result, the grinding studs 12 are respectively urged further into the adhesive layers 14a to be in contact with the elastic pads 13. This can ensure that the abrasive particles 124 protrude outward at the height H from the surface 111 of the substrate 11.

In next step 212, the heating process can continue until the adhesive layers 14a solidify at the curing temperature.

Figure 6E:
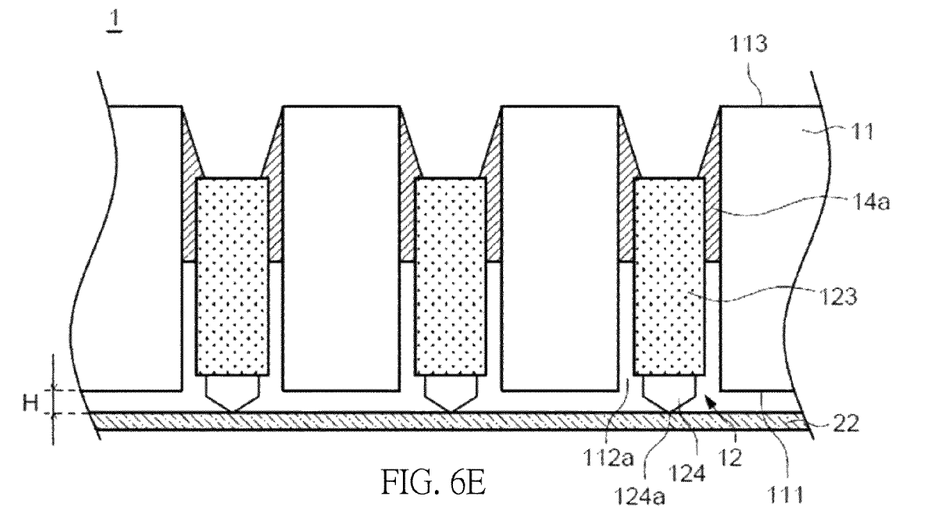

Referring to FIGS. 5 and 6E, in step 214, the assembly including the substrate 11, the lower and upper boards 21 and 22 and the elastic pads 13 is rotated so that the surface 113 of the substrate 11 is positioned upward. The first press board 21 and the elastic pads 13 then can be removed, while the second press board 22 is kept in place so as to prevent falling of the grinding studs 12 from the holes 112a. Owing to the flexibility of the elastic pads 13 (e.g., silicone pads), there is a relatively poor adherence between the elastic pads 13 and the adhesive layers 14a. Accordingly, the elastic pads 13 can be easily removed after solidification of the adhesive layers 14a.

Figure 6F:
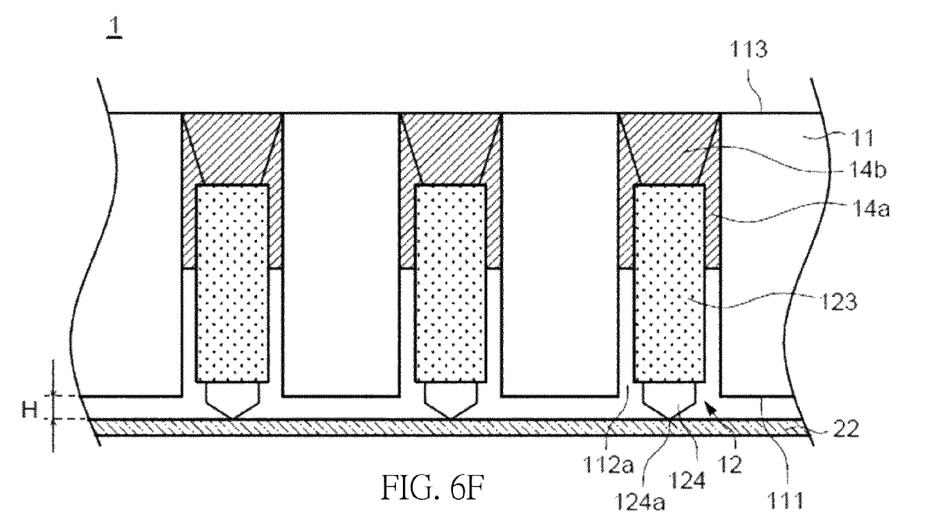

Referring to FIGS. 5 and 6F, in next step 216, adhesive layers 14b are respectively filled in the gaps left by the removed elastic pads 13. The adhesive layers 14b then can be heated to the curing temperature for solidification. The two adhesive layers 14a and 14b in each hole 112a can form an adhesive element 14 that fixedly hold the grinding stud 12 in place.

Figure 7:
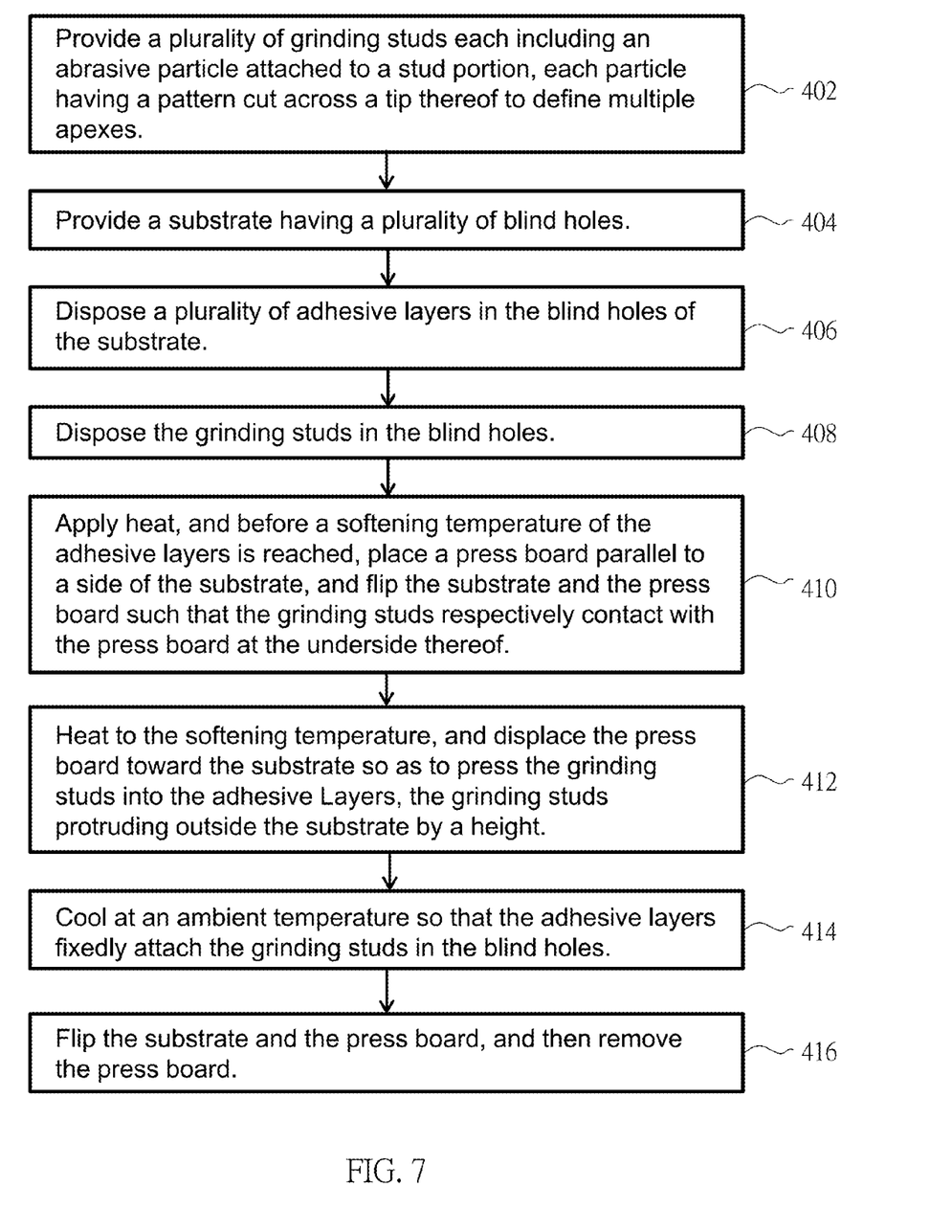
FIG. 7 is a flowchart illustrating an embodiment of exemplary method steps for fabricating a grinding tool.

FIG. 7 is a flowchart illustrating another embodiment of method steps for fabricating a grinding tool, and FIGS. 8A through 8F are cross-sectional views illustrating intermediate stages in the fabrication of a grinding tool according to the flowchart of FIG. 7. Referring to FIG. 7, in initial step 402, a plurality of grinding studs 12 are provided, each including a stud portion 123 and an abrasive particle 124 attached to each other. Like previously described, the pattern 310 can be cut across the tip of the abrasive particle 124 to define multiple apexes adjacent to one another.

Figure 8A:
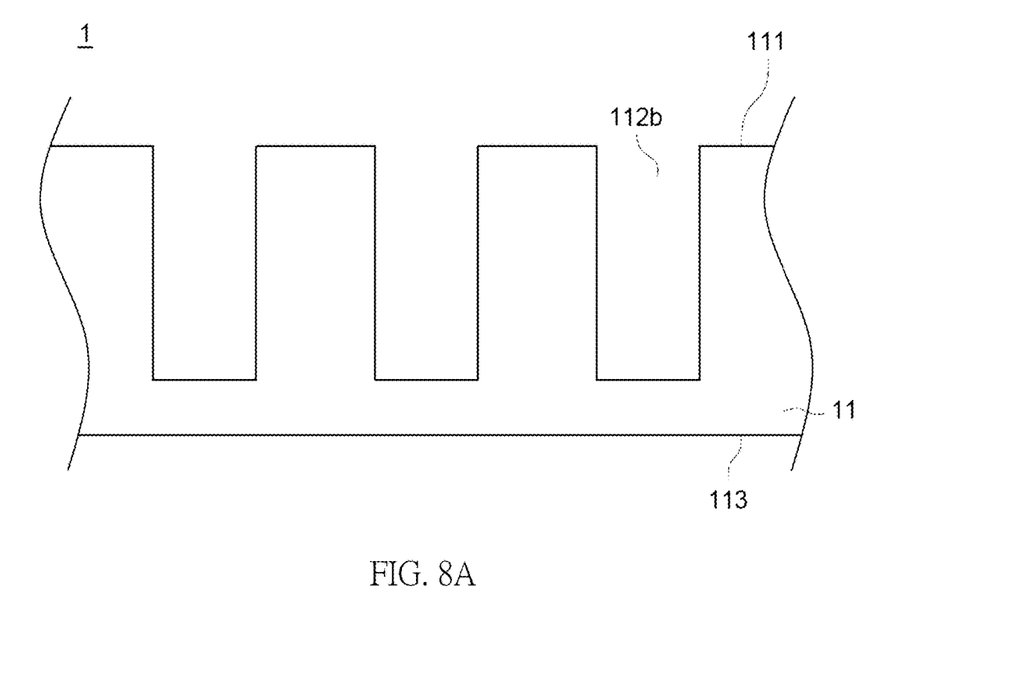
FIGS. 8A through 8F are cross-sectional views illustrating intermediate stages in the fabrication of a grinding tool according to the flowchart shown FIG. 7.

Referring to FIGS. 7 and 8A, in step 404, a substrate 11 having a plurality of openings is provided. The openings can be blind holes 112b that are opened on the surface 111 of the substrate 11 and closed on the surface 113 of the substrate 11.

Figure 8B:
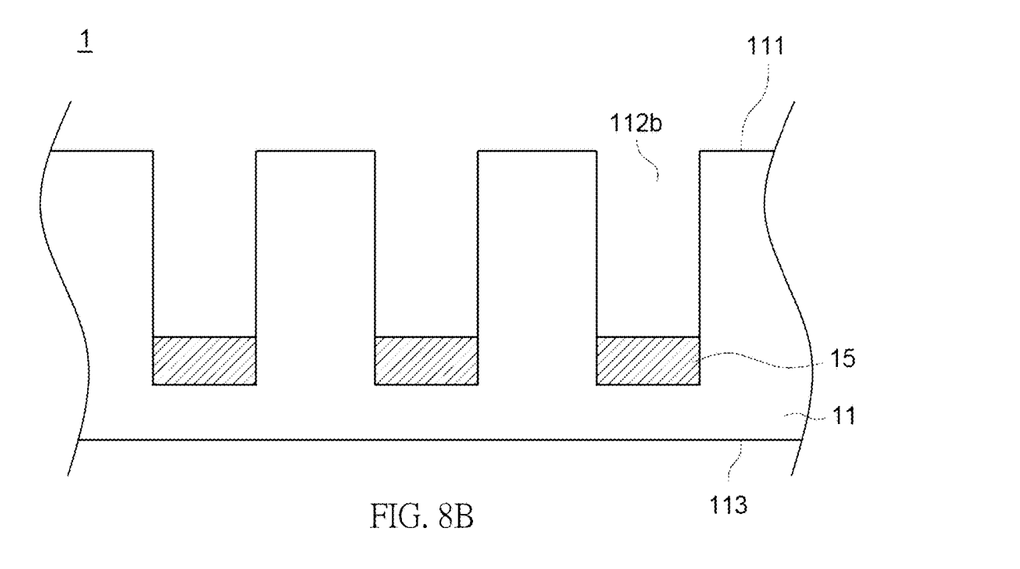

Referring to FIGS. 7 and 8B, in step 406, a plurality of adhesive layers 15 (e.g., hot-melt adhesives or acrylic adhesives) can be respectively applied in the blind holes 112b.

Figure 8C:
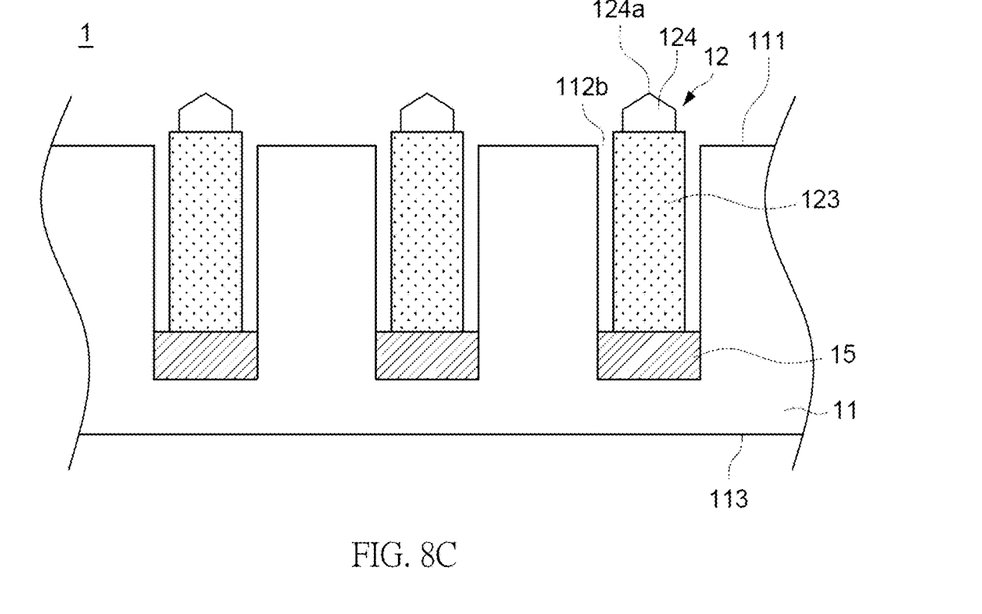

Referring to FIGS. 7 and 8C, the grinding studs 12 in step 408 can be respectively disposed in the blind holes 112b so that the stud portions 123 respectively contact with the adhesive layers 15.

Figure 8D:
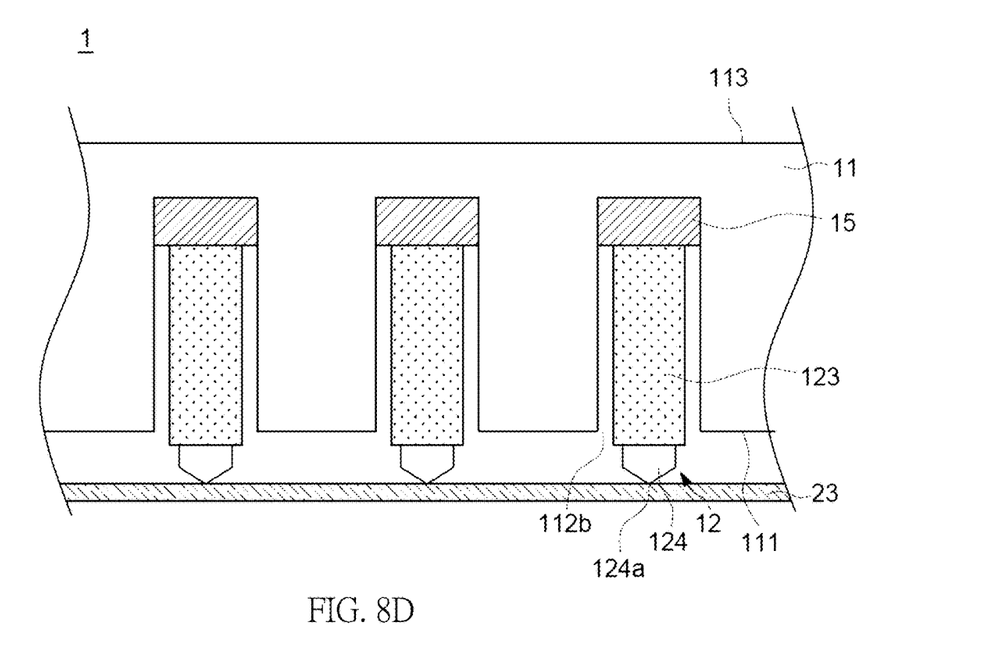

The adhesive layers 15 applied in the blind holes 112b of the substrate 11 can have a solid state at an ambient temperature, and can soften after they are heated to a softening temperature. Referring to FIGS. 7 and 8D, in step 410, the adhesive layers 15 can be subjected to a heating process, e.g., by heating the substrate 11 in an oven.

Before the softening temperature is reached, a press board 23 is disposed generally parallel to the surface 111 of the substrate 11 and adjacent to the grinding studs 12, and both the press board 23 and the substrate 11 are flipped so that the surface 111 of the substrate 11 and the press board 23 are positioned downward while the surface 113 is positioned upward. As a result, the abrasive particles 124 of the grinding studs 12 can respectively contact with the press board 23 at the underside thereof by gravity action.

Figure 8E:
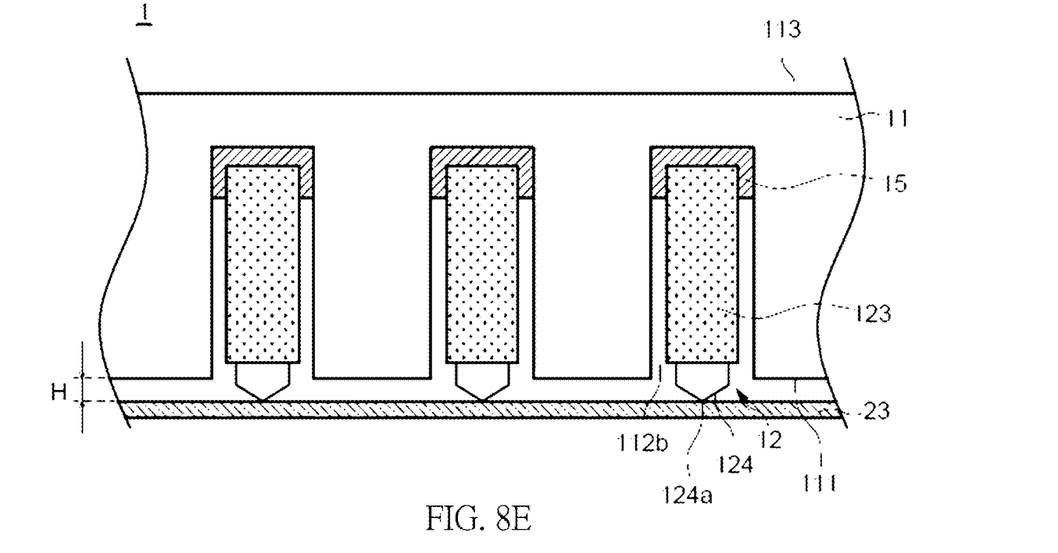

Referring to FIGS. 7 and 8E, in next step 412, the adhesive layers 15 are heated to the softening temperature, and the press board 23 is controllably displaced toward the surface 111 of the substrate 11, which respectively pushes the grinding studs 12 into the adhesive layers 15. The displacement of the press board 23 allows to controllably set a height H at which the abrasive particles 124 protrude outward from the surface 111 of the substrate 11.

Figure 8F:
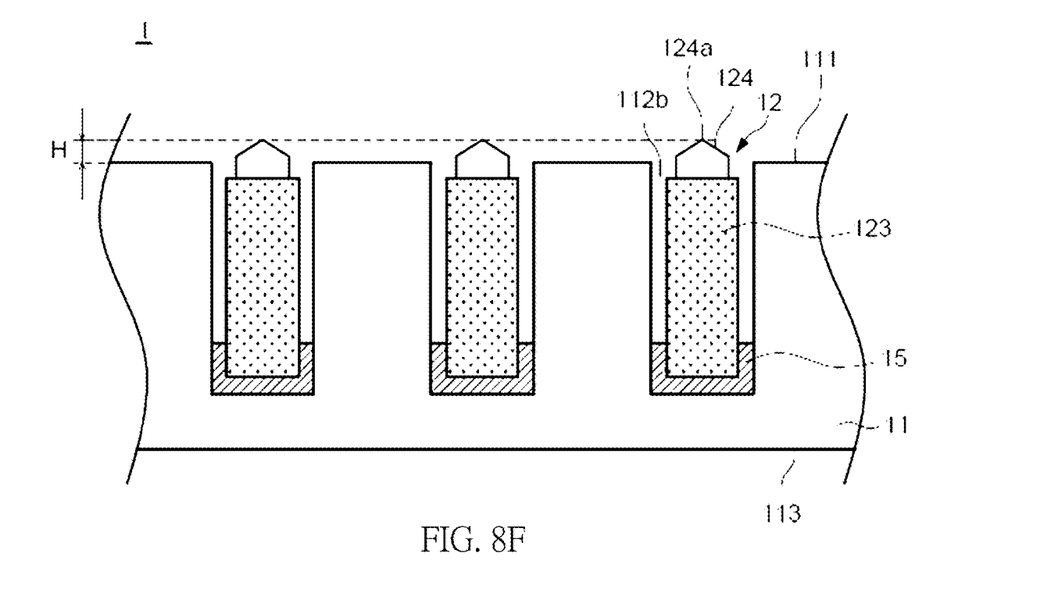

Referring to FIGS. 7 and 8F, in next step 414, the substrate 11 is then cooled at ambient temperature, and the adhesive layers 15 can fixedly attach the stud portions 123 in the blind holes 112b, thereby fixedly attaching the grinding studs 12 with the substrate 11.

Lastly, the substrate 11 in step 416 is flipped so that the surface 111 thereof is positioned upward, and the press board 23 then can be removed. The grinding tool 1 thereby fabricated can have the abrasive particles 124 with multi-apex tips held by the stud portions 123 at the height H from the surface 111 of the substrate 11.

Advantages of the grinding tools described herein include using abrasive particles with multi-apex tips, so that the cutting rate of the grinding tools can be increased without the need of adding abrasive particles. The grinding tools thus have better performance, and can be fabricated in a cost-effective manner.

Realizations of the grinding tools and its manufacture process have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A method of fabricating a grinding tool, comprising:
providing a plurality of grinding studs, each of the grinding studs including a stud portion and an abrasive particle bonded to each other;
cutting a pattern across a tip of each of the abrasive particles to define multiple apexes adjacent to one another and a groove extending between the multiple apexes;
providing a substrate having a plurality of openings; and
respectively attaching the grinding studs in the openings, the abrasive particles of the grinding studs protruding outward from a surface of the substrate.

2. The method according to claim 1, wherein the openings are holes respectively opened on a first and a second surface of the substrate opposite to each other, and the step of respectively attaching the grinding studs in the openings includes:
placing a first press board adjacent to the first surface of the substrate;
respectively disposing a plurality of elastic pads in the holes;
respectively applying a plurality of adhesive layers in the holes;
respectively disposing the grinding studs in the holes; and
heating the adhesive layers, wherein before the adhesive layers reach a curing temperature, placing a second press board in contact against the grinding studs, whereby the grinding studs are respectively urged into the adhesive layers and respectively contact with the elastic pads.

3. The method according to claim 1, wherein the openings are blind holes, and the step of respectively attaching the grinding studs in the openings includes:
respectively applying a plurality of adhesive layers in the blind holes;
respectively disposing the grinding studs in the holes; and
heating the adhesive layers, wherein before the adhesive layers reach a softening temperature, placing a press board adjacent to the grinding studs, and when the adhesive layers reach the softening temperature displacing the press board toward the substrate so as to respectively urge the grinding studs into the adhesive layers.

4. The method according to claim 1, wherein the pattern is cut across the tip of each of the abrasive particles by laser.

5. The method according to claim 1, wherein each of the abrasive particles has a plurality of side surfaces adjacent to the tip thereof, and the cut pattern respectively extends onto each of the side surfaces.

6. The method according to claim 1, wherein the pattern includes a cross shape.

7. The method according to claim 1, wherein the abrasive particles are respectively bonded to the stud portions by brazing, sintering or electroplating.

* * * * *